Aug. 9, 1960  K. A. MARGGRAF  2,948,495
CONTROL APPARATUS FOR AN AIRCRAFT
Filed Jan. 29, 1954  2 Sheets-Sheet 2

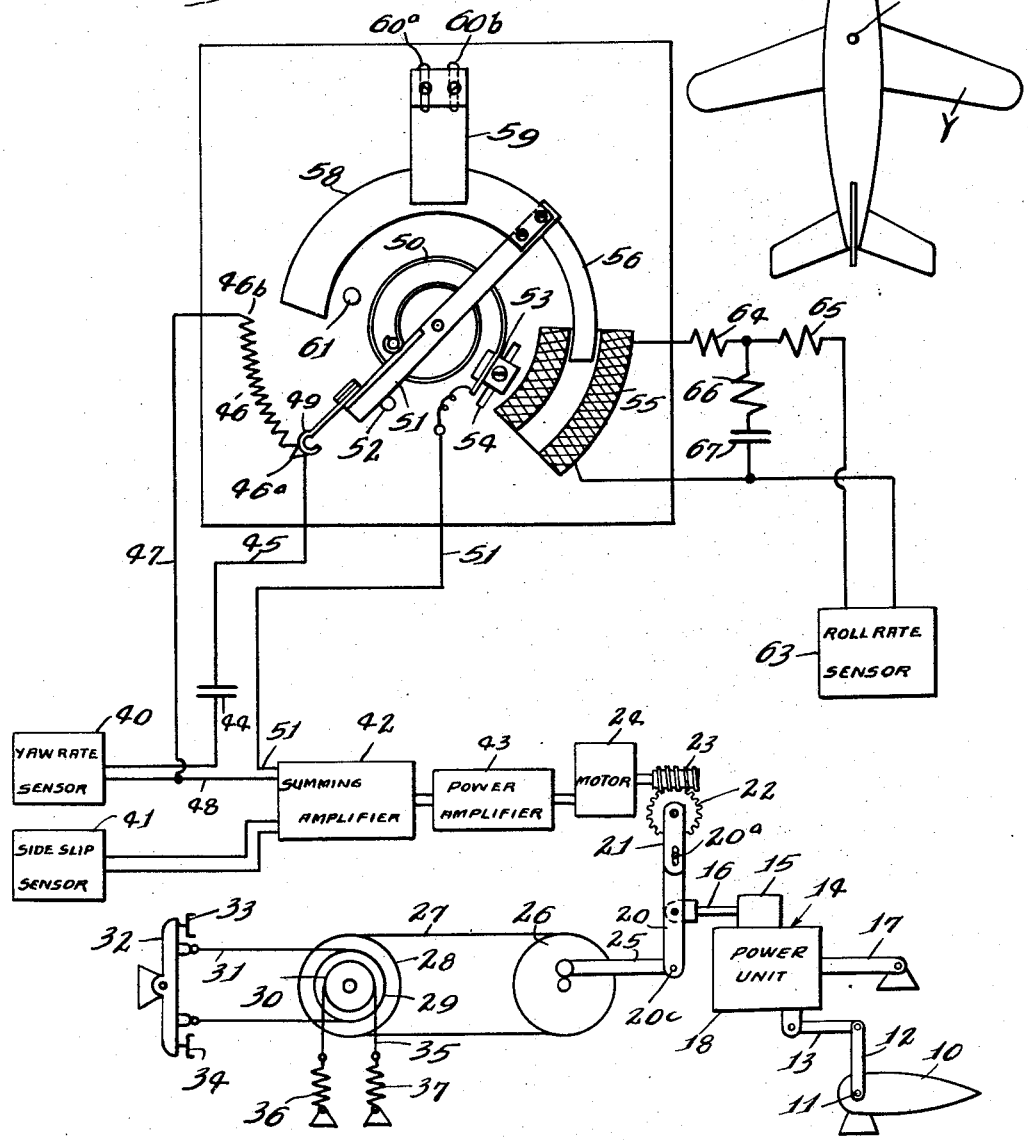

Inventor.
Kurt A. Marggraf.
By Schroeder, Hofgren, Brady & Wegner.
Attorneys.

United States Patent Office 2,948,495
Patented Aug. 9, 1960

2,948,495

CONTROL APPARATUS FOR AN AIRCRAFT

Kurt A. Marggraf, Lemont, Ill., assignor to Ampatco Laboratories Corporation, a corporation of Delaware Filed Jan. 29, 1954, Ser. No. 407,121

9 Claims. (Cl. 244—77)

This invention relates to control apparatus for an aircraft, and more particularly to a control system for an aircraft including automatic mechanism for damping undesired oscillations or flight variations.

The extremely high speeds of some modern aircraft have resulted in very poor inherent stability, as contrasted with that of older and slower types of aircraft. The instability of the aircraft makes manual control extremely difficult and causes it to require far more than average skill. Accordingly, most very high speed modern aircraft include an automatic mechanism for stabilizing the aircraft by moving one or more of the control elements. Such an automatic mechanism is not as complex as a fully automatic auto pilot system, and not capable of replacing the human pilot, but it does compensate for the natural instability of the aircraft and correct for small transient variations in flight conditions without the necessity of constant movement of the manual controls by the pilot. These automatic control mechanisms which provide a servo action to replace the lack of inherent stability of high speed modern aircraft are generally called dampers or stability augmentors to distinguish them from the more complex automatic mechanisms providing full auto-pilot operation.

One of the most undesirable motions or oscillations of a high speed aircraft due to this instability is called the dutch roll. This dutch roll is an oscillation of complex nature which comprises yawing, rolling and side slipping. The period of the oscillation is relatively long, as of the order of two or three seconds, and the oscillation dies out so slowly that in most situations another disturbance initiates continuance of the dutch roll before the oscillation initiated by a previous disturbance has died out. Even though the amplitude of this oscillation may not be great, it introduces a continuous motion making the airplane a very poor shooting platform, especially due to the side slip or transverse motion which introduces a lateral component into the forward direction of the airplane, and thus also into that of any shells, rockets, or other projectiles fired from the plane.

Moreover, the three motions of yawing, rolling and side slipping normally occur out of phase with each other and it is difficult for a pilot to apply the correct amount of deflection at the right time to overcome this undesirable motion. Accordingly, an automatic mechanism or damper for damping out at least the dutch roll is substantially a necessity in any modern very high speed aircraft, and this automatic control is usually applied to the action of the rudder; that is, the automatic mechanism moves the rudder in order to overcome yaw or side slip and thus damp out dutch roll immediately upon its inception. While most high speed aircraft include automatic mechanism for damping out undesired movements about all three of the axes of the aircraft, or at least two, the most important damping is that used on the rudder for correction of the dutch roll; and the fact that it works on the rudder of the aircraft presents particular problems with which this invention is concerned.

Since the automatic mechanism operative upon the rudder is designed and intended to provide automatic control movement of the rudder so as to overcome yawing or side slipping, any desired yaw of the aircraft (i.e., any turn endeavored to be manually effected by the rudder) is also opposed by the automatic damping mechanism. Since the automatic mechanism providing the damping action is normally operative at all times during flight of a high speed aircraft, the situation is not satisfactorily obviated by turning off the mechanism, or by adjusting a knob on the mechanism, as is sometimes done on autopilot systems. In combat, for example, or under conditions where combat is expected momentarily, it is desired to have the damping mechanism operative at all times; and yet this is exactly a time when sharp turns may have to be made with extreme rapidity. Similarly, rudder action in modern high speed aircraft is of such a nature that it is not feasible to cut out the operation of the automatic damping mechanism by movement of the pedals or other manual controls of the aircraft, the term "manual control" being used here to include the foot operated rudders as well as any hand operated stick or wheel. Utilization of stick or pedal pick-off to render the automatic damping mechanism inoperative on the rudder would require the pilot to hold the stick or pedals substantially displaced during the entire time. However, most modern high speed aircraft do not require any control surface deflection of the rudder in order to continue satisfactorily in a turn once it has been initiated; in fact, under some circumstances the rudder may have to be deflected slightly oppositely after entry into a turn.

This invention is concerned with automatic control systems or dampers which operate on the rudder of an aircraft. The invention contemplates making the automatic mechanism responsive only to the change of turn or variation in rate of turn; that is, rate of change rather than actual turn or amount of turn. It then further contemplates rendering the automatic control mechanism ineffective at initiation and completion of a turn, by use of some other flight condition of the aircraft than the one controlled by the rudder, as for example, roll of the aircraft upon use of ailerons.

One feature of this invention is that it provides an improved automatic damping or stability augmenting system for high speed aircraft; another feature of this invention is that it provides means for automatically neutralizing the effect of automatic control mechanism on the rudder of an aircraft when a desired turn is being manually effected; a further feature of this invention is that automatic rudder variations are effected as a function of rate of change of turn, rather than as a function of the turn itself, during normal automatic control; yet another feature of this invention is that automatic means are provided for obviating or rendering ineffective the automatic damping control upon initiation and termination of a turn; another feature of this invention is that the automatic arrangement for rendering the rudder control mechanism temporarily ineffective is effected by another flight condition of the aircraft, as rate of roll effected by aileron action. Still another feature of the invention is that automatic control of the rudder may be a function of two factors, and one of these factors may be left in operation even during a turn; other features and advantages of this invention will be apparent from the following specification and the drawings, in which:

Figure 1 is a schematic illustration of an aircraft illustrating the three axes about which movements of the aircraft normally take place;

Figure 2 is a diagrammatic illustration of a rudder control system showing the manual and automatic control sections and incorporating the invention to which this application is directed.

Figure 3A:
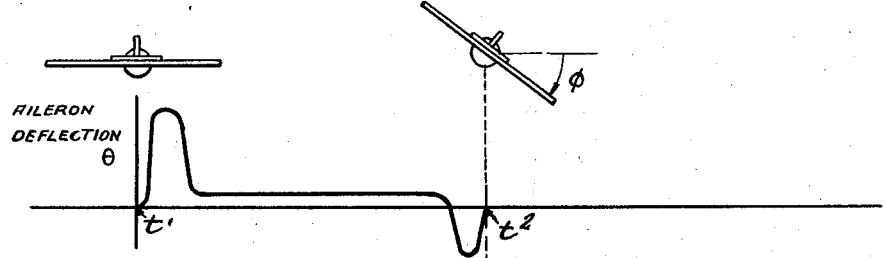
Figures 3a to 3f inclusive, are curves or diagrams illustrative of various operations and functions occurring during initiation of a turn.

Referring first to Figure 1, it will be understood that aircraft roll takes place about the longitudinal axis X; diving or climbing is effected by movement of the aircraft about the transverse axis Y; and yaw or turn takes place by movement about the normally vertical axis Z. The dutch roll previously mentioned is a combination of yawing, rolling and side-slipping (or translational movement in the direction of the axis Y), these various components generally occuring out of phase with each other and in an oscillation which is most readily controlled by the rudder.

Referring now more particularly to the embodiment of my invention illustrated in Figure 2, it will be seen that the rudder 10 is pivotally mounted about the axis 11 and is controlled through the lever arm 12 and link 13 by a power unit indicated in general as 14. This power unit is of an irreversible type wherein the outer cylinder moves as a result of operation of a valve member in the valve box 15, the valve member being moved by the arm or rod 16. The outer casing has a cylinder having movable therein a piston which is rigidly mounted on the end of the arm 17, the other end of this arm being rigidly mounted on the aircraft frame so that the piston is immovable relative to the frame of the aircraft. Movement of the valve by the rod 16 and admission of fluid to one side or the other of the piston therefor effects movement of the power unit cylinder 18 in one direction or the other, this effecting a desired movement of the rudder 10. If further details of such an irreversible power unit are desired, reference may be made to Patent No. 2,395,671 issued to Kleinhans on February 26, 1946. In order that rudder operation may be a function both of manual and automatic control mechanism, the valve rod 16 is here shown as connected at the center of a lever 20 which comprises a differential member having automatic control mechanism connected to one end and manual control mechanism to the other end. In the apparatus here illustrated, the upper end 20a of the lever arm is connected to a control link or lever 21 rigidly mounted on a gear 22 adapted to be rotated by worm 23 in turn driven by a motor 24. The motor 24 is actuated as part of the automatic rudder control by apparatus hereinafter more fully described, and the use of a worm drive renders the action irreversible so that the automatically controlled end of the lever 21 stands in a given position at any time that the motor 24 is not operating, and provides a fulcrum for operation of the differential lever by the manual control means. Since the automatic damping control mechanism illustrated here normally does not vary its control far from the center point, this action is sufficient without any necessity of returning the control point to a zero or neutral position.

The other end of the differential lever 20, the end 20c, is connected to the link 25 which has its other end connected to the pulley 26. The pulley 26 is adapted to be moved through a cable or belt 27 by rotation of the pulley 28, this pulley being one of a group of integrally mounted pulleys, including also the pulleys 29 and 30. The pulley 29 is connected by a belt or cable 31 to the foot bar 32 having the pedals 33 and 34 mounted thereon, so that movement of the pedals affects movement of the pulleys 28 and 29 and thus also (through the pulley 26 and the link 25) of the differential lever 20 and the valve rod 16. The pedals and their associated mechanism provide a portion of the conventional manual controls of the aircraft. The pulley 30 has a cable 35 passing thereover and having its ends connected to a pair of springs 36 and 37 having their other ends fixedly mounted on the aircraft frame. This provides a centralizing or stabilizing influence on the pedals, and an artificial or simulated "feel" taking the place of the feel of the rudder action common in a slower and simpler aircraft without an irreversible power unit.

Automatic actuation of the rudder for stabilizing influence on flight is here shown as derived from signals provided by the yaw rate sensor 40 and side slip sensor 41, signals from these two signal sources being delivered to a summing amplifier 42 (through mechanism including my invention, in one case), the output of the summing amplifier acting through a power amplifier 43 to drive the motor 24 previously described. The yaw rate sensor would generally comprise a "rate" gyro giving a signal which is a function of the amount of turn or yaw of the aircraft; and while the side slip sensor may be an accelerometer, it is quite frequently merely a small vane located below the fuselage and adjusting itself to the direction of the slip stream or air stream, any movement being translated by a potentiometer or the like into a voltage signal.

In the functioning of my invention I do not use the signal derived from the rate gyro directly as derived, but modified in a manner which will be described; and this is combined with the side slip sensor in the summing amplifier to give a stabilizing signal actuating the motor in a manner stabilizing or damping oscillations of the aircraft. I prefer to make the input signals to the summing amplifier from the side slip sensor somewhat less than derived from the yaw rate sensor; and I provide means not only for modifying the signal from this yaw rate sensor, but also for temporarily rendering it ineffective or inoperative at the initiation and completion of a turn. Whereas the rate gyro in the yaw rate sensor would provide a signal which is a function of the amount or "shortness" of turn or yaw of the aircraft about the axis Z, I modify the input to the summing amplifier 42 by providing a coupling condenser 44 through which the signal from the yaw rate sensor must pass in reaching the summing amplifier.

It is to be noted that this is not a part of the conventional compensating network sometimes used with rate or other gyros, providing dynamic characteristics more closely matching those desired in the signal; but is a complete blocking or coupling condenser such that only changes in voltage rather than any given voltage, pass through it and reach the summing amplifier. Accordingly, the signal reaching the summing amplifier from the yaw rate sensor is no longer a function of the amount of yaw or turn, or shortness of turn, but is instead a function of rate of variation or rate of change of turn. Since this is the case, any given steady amount of turn, as the normal central portion of a turn once an aircraft has gotten into a turn, no longer provides a signal tending to make the automatic control mechanism affect the position of the rudder. This in no way, however, detracts from the effectiveness of the automatic damping control, since the transient changes in flight conditions which are required to be controlled to effect the desired stability of operation of the aircraft are constantly changing; and such changes result in a signal voltage appearing at the input of the summing amplifier despite the presence of the blocking condenser 44.

In order to prevent the sharp changes in turn which take place at initiation and completion of a turn from causing the automatic mechanism to oppose the manual control, I provide means for rendering the signal ineffective at these times. However, I prefer to leave the side slip sensor signal in operation at all times, so that there is some stabilizing influence on the rudder to help prevent initiation or carrying on of dutch roll or other undesirable variations in the flight of the aircraft even during such times as the yaw rate sensor is rendered ineffective to provide a signal to the summing amplifier and the automatic damping mechanism. Were it not for rendering the automatic damping mechanism substantially ineffective at initiation of a turn, movement of the pedals would, because of the presence of the differential lever 20, be compensated for by the automatic mechanism and it would be substantially impossible to get into a desired turn. It is only because the condenser 44 renders the automatic damping mechanism ineffective to operate during a steady portion of a turn, and that other means render it ineffective at the initiation and completion of a turn, that one can operate the foot pedals 33 and 34 and thus manually effect rudder control without this being counter-balanced or neutralized by automatic control mechanism operation.

It will be seen that the circuit from the yaw rate sensor to the input of the summing amplifier 42 is a two wire circuit. One circuit connection includes the condenser 44 and the lead 45 to one end 46a of the resistance element 46 of a potentiometer, the other end 46b of this resistance element being connected through the lead 47 to the other input wire 48 leading to the input of the summing amplifier 42. When the movable element 49 or wiper member of the potentiometer is at the end 46a as illustrated in Figure 2, any signal passing through the condenser 44 passes through this element 49, through the spiral spring 50 and through the lead 51 to the input of the summing amplifier. The wiper member 49 is carried on one end of a pivotal arm 51, this arm being spring biased by the spring 50 to the position illustrated in Figure 2, against the pin or stop 52. One end of the spiral spring 50 engages the arm and a conducting strip continuing the circuit from the wiper element 49; and the other end of the spiral spring is held in a block 53 which is slidably adjustable in the slot 54 to provide adjustment of the initial or normal spring tension applied to the arm 51 when it is in contact with the stop pin 52. This provides a mechanical adjustment of the amount of force necessary to initiate movement of the arm, and thus movement of the wiper element along the potentiometer resistance. It will be understood that an equivalent arrangement could be effected by having the spring with a fixed tension and arranging for an adjustment of the amount of electrical force applied to the arm.

In order to overcome the initial bias of the spring 50 on the arm 51 and move the potentiometer wiper to the other end of the resistance element when desired, I provide an arcuate solenoid winding 55 cooperating with an arcuate core member 56 carried by the arm 51. When the solenoid 55 is energized with current of sufficient intensity or amplitude, it rotates the arm clockwise as viewed in Figure 2 and moves the wiper element 49 to the end 46b of the potentiometer resistance element, this resulting in rendering ineffective the signal from the yaw rate sensor 40. Since it is undesirable to have a sharp or sudden change in an automatic control mechanism of this type, I prefer not only to use a potentiometer rather than to break contacts, but also to have the movement of the wiper element 49 along the potentiometer retarded somewhat. For this purpose I provide a copper segment 58 carried by the arm 51 and cooperating with a U-shaped permanent magnet 59 slidably mounted at one end at slots 60a and 60b. Movement of the magnet in or out varies its retarding effect (through eddy current action) upon the copper element and thus varies the amount of time required to move the arm 51 and wiper element 49 from one end of their limit of movement to the other end of their limit of movement determined by engagement of the arm 51 with the other stop element or stop pin 61.

Actuation of the solenoid winding 55, and thus movement of the arm 51 in a direction rendering the automatic damping mechanism ineffective (at least sufficiently so that it does not "fight" desired turns), is here illustrated as effected by a signal from a roll rate sensor 63. I again prefer to use a "rate" gyro providing a signal proportional to the velocity or speed of roll of the aircraft about the axis X as illustrated in Figure 1. For reasons more fully apparent hereinafter, it is desirable to have the signal from this roll rate sensor die out only after a predetermined interval. Accordingly, I provide a delay network here illustrated as comprising the resistors 64 and 65 in series with one of the leads from the roll rate sensor to the solenoid winding 55; and a resistor 66 and condenser 67 in shunt with the leads of this solenoid. It will be apparent that roll of the aircraft will energize the solenoid 55, and after its energization has reached a level sufficient to overcome the initial bias provided by the spring 50, will move the arm 51 clockwise. This will, within a time interval determined by the retarding effect of the magnet 59 and copper segment 58, move the wiper element 49 from the position illustrated to the other terminal position of movement near the end 46b of the potentiometer element. When the wiper or movable element 49 has reached this latter position it will render ineffective any signal from the yaw rate sensor to the summing amplifier; and will thus for practical purposes render ineffective the automatic damping mechanism otherwise operative upon the rudder.

Figure 3B:
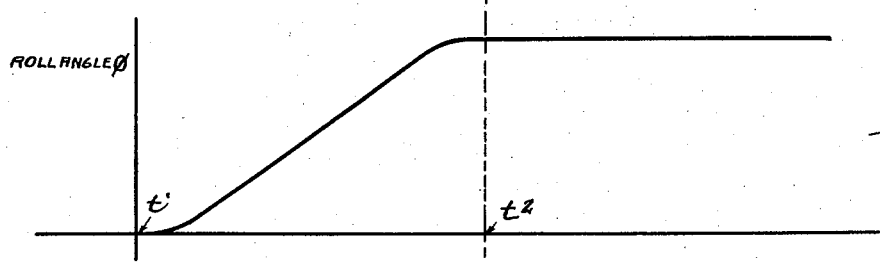

Referring now more particularly to Figures 3a to 3f, Figure 3a illustrates aileron deflection angle theta between two time limits $t_1$ and $t_2$ which are the beginning and end of the initial banking operation. Assuming the aircraft was flying straight and level just before the beginning of a desired turn, the ailerons would mechanically be manipulated or controlled to a very substantial angle at the point $t_1$; after the aircraft roll was initiated the ailerons would be turned to only a slight angular deviation sufficient to sustain the roll; and then as time interval $t_2$ was approached the ailerons would be deflected in the opposite direction to over come the momentum or inertia of the aircraft in its roll and to bring it to a stop at the desired bank angle phi. This latter angular deviation is illustrated in the curve of Figure 3b, wherein it is shown that the roll angle steadily increases from its zero position at $t_1$ to the desired bank for the anticipated turn, as shown at $t_2$. Roll velocity associated with roll angle is shown in the curve comprising Figure 3c, the roll velocity rising to a substantially fixed value and then dropping again to zero as the plane is held at the desired angle of bank. Meanwhile, yaw or turn velocity is shown by the solid line curve in Figure 3d. It will be noted that this yaw velocity has only reached about half of its ultimate value by the time interval indicated as $t_2$, continuing to rise until it finally levels off at the time indicated as $t_3$. This results in what is here being termed a "rate of change" signal from the yaw rate sensor which extends from the time $t_1$ to the time $t_3$, such signal being shown by the broken line in Figure 3d. It is to be understood that "rate of change" is being used in a generalized or approximate sense, rather than a literal mathematical. The provision of a signal exactly representing a derivative of velocity would require a more complex arrangement; but the simple condenser provides a suitable approximation of the curve, with some delay which improves stability.

Figure 3C:
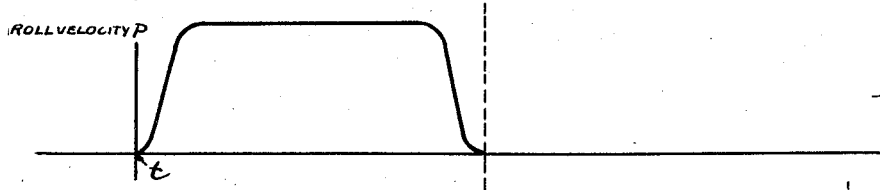
Figure 3D:
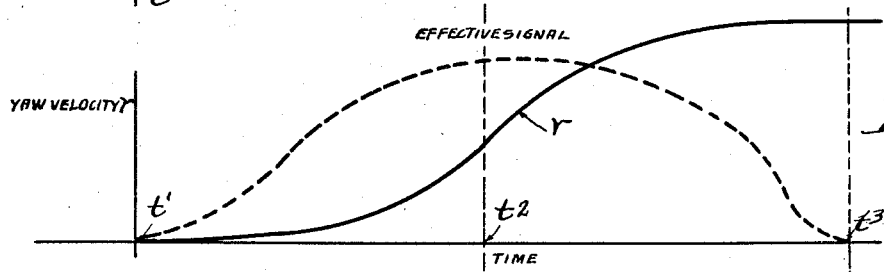
Figure 3E:
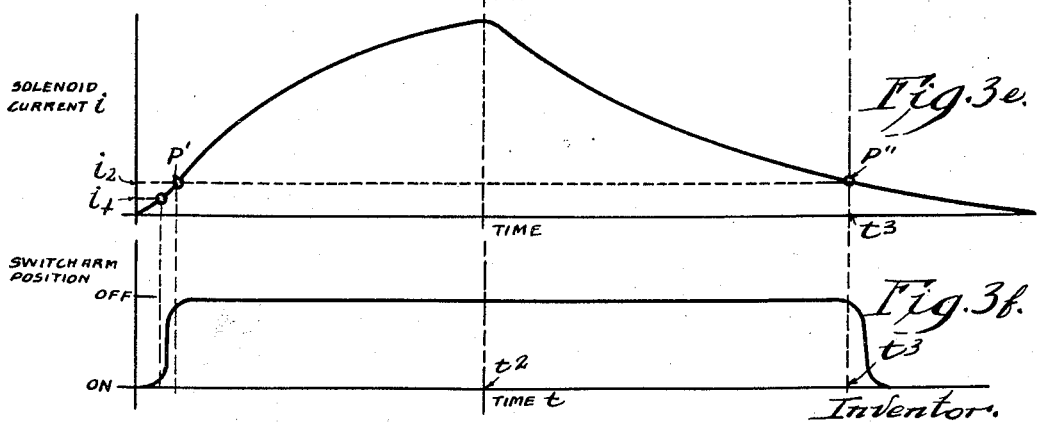

While at the initiation of a turn, the roll velocity as illustrated in Figure 3c increases to a given amount and then decreases to zero again at or about the time $t_2$, the provision of the delay circuit causes the solenoid current, as illustrated in Figure 3e, to continue in a desired amount to the time $t_3$. That is, almost immediately after initiation of the roll by manual actuation of the aileron, the current in the solenoid rises to a level $i_2$ (point P', as illustrated in the drawing) sufficient to cause the arm 51 to render the automatic rudder control mechanism substantially ineffective; and the current in the solenoid remains at or above this level to the point P'' at the time $t_3$, a substantial interval beyond the termination of the roll velocity and the attainment of the desired bank for the turn.

Figure 3F:
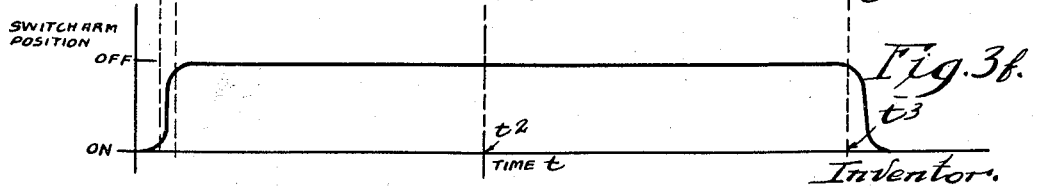

The current level indicated as $i_1$ in Figure 3e is the current level required to move the arm 51 against the resistance of the spiral spring 50; and the current level $i_2$ is that sufficient to move it to the other end or limit of its position and render the automatic damping mechanism operative upon the rudder ineffective for turn-resisting purposes. This is illustrated by the curve of Figure 3f, which shows the switch arm or potentiometer arm position, between the "on" position rendering the automatic damping mechanism fully effective, and the "off" position rendering it substantially ineffective. As illustrated in this figure, the switch arm is moved to the "off" position within a very small fraction of a second after the turn is initiated (by the automatic action resulting from aircraft bank), and kept in the "off" position until well after the desired bank has been achieved and the yaw velocity has reached the desired amount for the turn being indicated by the foot pedal position. When the switch returns (very shortly after the time point $t_3$) to the "on" position restoring the automatic damping control mechanism to its effective operation, the turn is in effect at what amounts to a constant turn or constant velocity of turn. From here on during the turn there is no undesired signal through the blocking or coupling condenser 44, since there is no change in the amount or rate of turn; and (except for flight condition transients) it is only at the termination of the turn that there is a sharp or substantial change in rate of components which would provide a corrective signal. At this time, the various actions heretofore described at the initiation of a turn are duplicated, only in reverse. That is, the aileron deflection reverses to bring the plane out of its bank back to a straight or level position; and rudder action tends to bring the plane to a straight and level flight. The effective signal from the change in yaw is again neutralized or rendered ineffective by the change in roll angles bringing the aircraft back to level position, together with the delay provided by the delay circuits energizing the solenoid. It will thus be seen that during the two periods of major change, at initiation and termination of a turn, the action of the automatic rudder damping control mechanism is rendered substantially ineffective; and that during the turn, when the yaw or turn is substantially constant, the tension of the damping or stabilizing mechanism is in effect and capable of obviating transient conditions which might otherwise cause a dutch roll or other undesirable effects.

It will thus be seen that no manual manipulation of knobs or other thought-requiring or time-consuming actions are necessary to prevent the damping or automatic control mechanism from resisting a turn when desired. Moreover, the operation is such, with this invention, that no foot pedal or other manual control operation need be used other than that which is normal to the pilot, the action of the automatic control mechanism, and its inactivity when desired, being determined by other factors than those of manual control position. That is, in this case it is the differentiation or use of a blocking condenser rending the automatic control responsive only to rate of change (rather than change itself) coupled with means for rendering it substantially entirely ineffective as a result of the function of another flight condition (roll angle of the aircraft in this case) that results in a very satisfactory and fully automatic action neutralizing the automatic damping mechanism which requires no thought and no different control action by the pilot other than that which he has been taught in slower training planes, and which is instinctive with him.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Control apparatus of the character described for the rudder of an aircraft, including: an automatic mechanism operatively connected to said rudder for moving it as a function of the rate of change of yaw of the aircraft thereby to eliminate the yaw; a manual control mechanism operatively connected to said rudder for moving it; and means operative as a function of a flight condition other than yaw, said means being controllable by another movable control member for temporarily rendering said automatic mechanism ineffective.

2. Control apparatus of the character described for the rudder of an aircraft, including: an automatic mechanism operatively connected to said rudder for moving it as a function of rate of change in a flight condition controllable by the rudder thereby to eliminate the change in said flight condition; control mechanism operatively connected to said rudder for moving it thereby to effect a change in said flight condition; and means for temporarily rendering said automatic mechanism ineffective as a result of a change of flight condition between straight flight and turn.

3. Control apparatus of the character described for the rudder of an aircraft, including: an automatic mechanism operatively connected to said rudder for moving it as a function of variation in a flight condition controllable by the rudder thereby to eliminate the variation in flight condition; a manual control mechanism operatively connected to said rudder for moving it thereby to effect a variation in said flight condition; and means operative as a result of rate of aircraft roll exceeding a predetermined amount for rendering said automatic mechanism ineffective.

4. Control apparatus of the character described for the rudder of an aircraft, including: an automatic mechanism operatively connected to said rudder for moving it as a function of variation in a flight condition controllable by the rudder thereby to eliminate the variation in flight condition; a manual control mechanism operatively connected to said rudder for moving it thereby to effect a variation in said flight condition; and means responsive to rate of aircraft roll for reducing the effectiveness of the automatic control action when the rate of aircraft roll exceeds a predetermined value.

5. Control apparatus of the character described for the rudder of an aircraft, including: an automatic mechanism operatively connected to said rudder for moving it as a function of variation in a flight condition controllable by the rudder thereby to eliminate the variation in flight condition; a manual control mechanism operatively connected to said rudder for moving it thereby to effect a variation in said flight condition; and means responsive to rate of aircraft roll for rendering said automatic mechanism temporarily ineffective at initiation and completion of a turn without rendering it ineffective during the intermediate portion of the turn wherein the rate of aircraft roll is substantially zero.

6. Control apparatus of the character described for the rudder of an aircraft, including: an automatic mechanism operatively connected to said rudder for moving it as a function of rate of change of yaw of the aircraft thereby to eliminate the yaw; a manual control mechanism operatively connected to said rudder for moving it; and means automatically operative as a result of rate of aircraft roll exceeding a predetermined amount of rendering said automatic mechanism ineffective.

7. Apparatus of the character claimed in claim 6, wherein means are provided for causing the effectiveness of the automatic mechanism to be progressively reduced.

8. Apparatus of the character claimed in claim 5, wherein means are provided to effect progressively the change between effectiveness and ineffectiveness of the automatic mechanism.

9. Control apparatus of the character described for the rudder of an aircraft, including: an automatic mechanism operatively connected to said rudder for moving it as a function of rate of change of yaw of the aircraft and another flight condition controllable by the rudder thereby to eliminate the yaw; a manual control mechanism operatively connected to said rudder for moving it; and means automatically responsive to rate of aircraft roll for rendering said automatic mechanism unresponsive to rate of change of yaw.

References Cited in the file of this patent

UNITED STATES PATENTS

| | | |
|---|---|---|
| 2,607,550 | Meredith | Aug. 19, 1952 |
| 2,630,282 | Halpert | Mar. 3, 1953 |
| 2,649,264 | Slater et al. | Aug. 18, 1953 |
| 2,686,021 | Halpert | Aug. 10, 1954 |